United States Patent Office 2,819,265
Patented Jan. 7, 1958

2,819,265

MANUFACTURE OF MELAMINE

John J. Healy, Jr., St. Louis, Mo., and Colver P. Dyer, Winchester, Mass., assignors to Monsanto Chemical Company, St. Louis, Mo., a corporation of Delaware No Drawing. Application August 15, 1955
Serial No. 528,528

13 Claims. (Cl. 260—249.7)

The present invention relates to a process for the manufacture of 2,4,6-triamino-1,3,5-triazine, more commonly known as melamine.

In the past, melamine has been produced by a variety of procedures, the more prominent of which is that known as the dicyandiamide process, wherein dicyandiamide is heated to produce melamine according to the following equation:

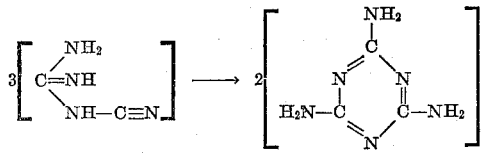

Generally the reaction above set forth has been carried out under positive pressure, and frequently in the presence of certain additive materials, such as, for example, ammonia, organic solvents, catalysts and the like, in order to control the reaction. Obviously, an objection to the dicyandiamide process is the use of relatively expensive dicyandiamide as a starting material. Other objections involve the use of additive materials such as, for example, solvents and the like, which further add to the cost of manufacture.

An object of the present invention is to provide a new process for the manufacture of melamine.

A further object is to provide a process for the manufacture of melamine employing relatively cheap starting materials.

Other objects will be apparent from the disclosure hereinafter set forth.

In accordance with the present invention melamine is prepared by heating urea, preferably in the presence of added ammonia, under positive pressure, that is, at super-atmospheric pressures, in the presence of an ammonium halide. The ammonium halide is preferably added to the charge of urea prior to the heating step. Furthermore, it is preferred to use relatively large amounts of urea and relatively small amounts of the ammonium halide. The overall equation for the reaction is believed to be as follows:

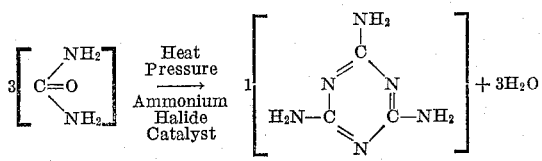

Temperatures sufficiently high to convert urea or intermediate products formed therefrom are required. Generally, temperatures in excess of 250° C., preferably in excess of 275° C., are employed, but it is preferred to employ temperatures between about 300 and 450° C. Pressures sufficiently high to minimize formation of intermediate and decomposition products such as, for example, biuret, cyanuric acid, ammelide and cyanic acid up to and at the temperatures necessary to convert the urea to melamine are employed. Thus, pressures between substantially 600 and 5000 pounds per square inch (gauge) or even higher have been employed. Generally, however, pressures of substantially 3000 to 5000 pounds per square inch (gauge) are preferred.

The invention will be more completely understood from the following specific examples, illustrating but not limiting the scope of the invention.

Example I 58.5 parts by weight of commercial urea, and 1.5 parts by weight of ammonium chloride were placed in an autoclave which was connected in turn with a source of ammonia, 90 parts by weight of ammonia passed into the autoclave, the vessel closed, and the mixture heated at a temperature of about 280° C. to about 310° C. and a pressure of substantially 750 pounds per square inch for about 1.5 hours. After allowing the reaction mass to cool down, and releasing the pressure, the reaction mass was extracted with boiling water, and 17.2 parts by weight of crystalline melamine was obtained therefrom. This represents a yield of 42%, based on the equation hereinbefore given.

Example II 90 parts by weight of urea and 2.3 parts by weight of ammonium chloride were placed in an autoclave, the autoclave closed and the contents heated for about 0.5 hour at a temperature of substantially 300° C. to 350° C. under a pressure of about 4000 pounds per square inch. After allowing the reaction mass to cool, releasing the pressure, and extracting the reaction product with boiling water, 25 parts by weight of melamine was obtained. This represents a 40% yield, based on the equation hereinbefore given.

As further examples of ammonium halides which can be used in this invention may be mentioned ammonium bromide, ammonium fluoride and ammonium iodide. While varying amounts of ammonium halides can be used, such compounds are preferably employed in relatively small amounts, for example, about 1 to 10% by weight, based on the weight of urea, and preferably about 2 to 10% by weight, based on the weight of urea.

If convenient or desirable, higher pressures may be employed with an accompanying increase in yield.

This application is a continuation-in-part of our co-pending application Serial No. 661,350, filed April 11, 1946.

What is claimed is:

1. A process for the manufacture of melamine which comprises heating urea and from about 1 to 10% by weight, based on the weight of urea, of an ammonium halide in a pressure-resistant vessel at a temperature between about 300 and 450° C. and under a pressure of at least 600 pounds per square inch (gauge), whereby melamine is produced, and recovering the thus produced melamine.

2. A process as in claim 1, but further characterized in that said ammonium halide is ammonium bromide.

3. A process for the manufacture of melamine which comprises heating ammonia, urea and from about 1 to 10% by weight, based on the weight of urea, of an ammonium halide in a pressure-resistant vessel at a temperature between about 300 and 450° C. and under a pressure of at least 600 pounds per square inch (gauge), whereby melamine is produced, and recovering the thus produced melamine.

4. A process as in claim 3, but further characterized in that said ammonium halide is ammonium bromide.

5. A process for the manufacture of melamine which comprises heating urea and from 1 to 10% by weight, based on the weight of urea, of ammonium chloride in a pressure-resistant vessel at a temperature between about 300 and 450° C. and under a pressure of at least 600 pounds per square inch (gauge), whereby melamine is produced, and recovering the thus produced melamine.

6. A process for the manufacture of melamine which comprises heating ammonia, urea and from 1 to 10% by weight, based on the weight of urea, of an ammonium chloride in a pressure-resistant vessel at a temperature between about 300 and 450° C. and under a pressure of at least 600 pounds per square inch (gauge), whereby melamine is produced, and recovering the thus produced melamine.

7. A process for the manufacture of melamine which comprises heating urea and from 1 to 10% by weight, based on the weight of urea, of an ammonium halide in a pressure-resistant vessel at a temperature between about 300 and 450° C. and at a pressure of about 3000 to 5000 pounds per square inch (gauge), whereby melamine is produced, and recovering said melamine.

8. A process as in claim 7, but further characterized in that said ammonium halide is ammonium bromide.

9. A process as in claim 7, but further characterized in that said ammonium halide is ammonium fluoride.

10. A process as in claim 7, but further characterized in that said ammonium halide is ammonium iodide.

11. A process of preparing melamine which comprises heating urea and from 1 to 10% by weight, based on the weight of urea, of ammonium chloride in a pressure-resistant vessel at a temperature of about 350° C. under a pressure of at least 600 pounds per square inch (gauge), whereby melamine is produced, and recovering the thus produced melamine.

12. A process for the manufacture of melamine which comprises heating urea and from 1 to 10% by weight, based on the weight of urea, of ammonium chloride in a pressure-resistant vessel at a temperature between about 300 and 450° C. and at a pressure of about 3000 to 5000 pounds per square inch (gauge), whereby melamine is produced, and recovering said melamine.

13. A process as in claim 12, but further characterized in that ammonia is heated with the urea and ammonium chloride.

No references cited.